A. M. KRUSE.
METALLIC RECEPTACLE.
APPLICATION FILED SEPT. 14, 1911.
1,090,218.
Patented Mar. 17, 1914.
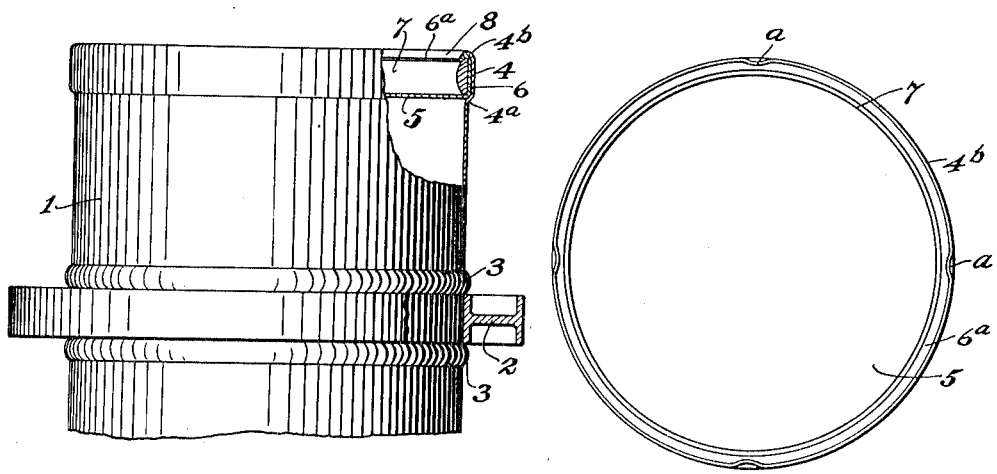
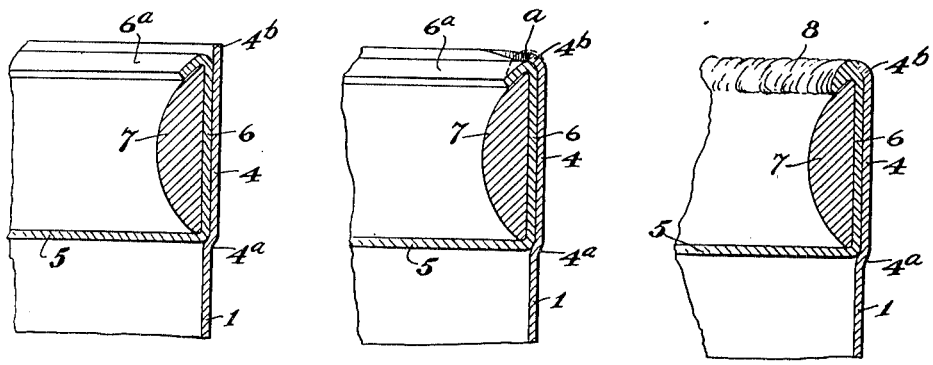
Witnesses:
F. C. Valentine
E. P. Schlosser
Inventor:
August M. Kruse,
by Ohed C. Billman
Attorney.

UNITED STATES PATENT OFFICE.

AUGUST M. KRUSE, OF DEFIANCE, OHIO, ASSIGNOR TO THE AMERICAN STEEL PACKAGE COMPANY, OF DEFIANCE, OHIO, A CORPORATION OF OHIO.

METALLIC RECEPTACLE.

1,090,218.　　　　　Specification of Letters Patent.　　Patented Mar. 17, 1914.

Application filed September 14, 1911. Serial No. 649,270.

*To all whom it may concern:*

Be it known that I, AUGUST M. KRUSE, a citizen of the United States, residing at Defiance, in the county of Defiance and State of Ohio, have invented certain new and useful Improvements in Metallic Receptacles, of which the following is a specification.

My invention relates to improvements in metallic receptacles, and more particularly to the construction of metallic barrels and similar vessels designed to carry liquids and other substances requiring fluid or liquid-tight receptacles.

The invention relates more particularly to the form or method of constructing the meeting edges of the head and body portions of the barrel or vessel at the chime portion thereof whereby to form a liquid-tight barrel or package, the parts being reinforced and particularly designed and adapted to modern welding processes.

A further object is to provide improved reinforced chime welding rims presenting advantageously disposed welding edges for modern methods of melding such as "autogenous" and other welding processes, said welding edges being adapted to coöperate with the reinforcing element in giving great strength and rigidity to the head and chime portions of the barrel.

With the above mentioned and other objects in view, the invention consists in the novel construction, arrangement, and combination of parts, hereinafter described, illustrated in some of its embodiments in the accompanying drawings, and particularly pointed out in the appended claims.

Referring to the drawings forming a part of this specification, Figure 1, is a side elevation of a barrel constructed in accordance with my invention, a portion of its walls being broken away for the purpose of clearer illustration of the parts. Fig. 2, a plan view of the head end of the barrel, illustrating a method of initially holding or securing the improved reinforced head and rim preparatory to being subjected to and united by the welding process. Fig. 3, a sectional view of the rim or chime portion of the improved barrel before being welded. Fig. 4, a similar view, the dotted lines illustrating the manner in which the welding is distributed to unite the exposed edges of the head and chime welding rims. Fig. 5, a similar view of the complete welded chime.

Similar numerals of reference designate like parts throughout all the figures of the drawings.

The improved metallic receptacle, when made in the form of a barrel comprises a cylindrical shaped main body portion or barrel body 1, preferably provided with a pair of tread rings or members 2, arranged on either side of the longitudinal center of the vessel and designed to afford a bearing surface for rolling the same while in transportation or storage. The tread rings are preferably of I-shape in cross section and are preferably secured in place after being slipped over the barrel body by rolling outwardly extending corrugations or beadings 3, on either side of the base of the tread rings whereby the latter are securely held as against longitudinal movement on the barrel body.

The barrel body is provided at its ends with chime welding rims 4, preferably slightly off-set to provide head supporting shoulders $4^a$, as shown.

The heads 5, are each provided with outwardly extending rims 6, within the ends of the barrel body, said heads resting on the shoulders $4^a$, and said outwardly extending rims being seated within the chime welding rims and having their outer marginal edges disposed in close proximity to the outer marginal or welding edges $4^b$, of the chime rims for convenient welding as hereinafter described.

As a means for securely reinforcing the head and chime or rim portions of the barrel, and particularly for the purpose of reinforcing the heads 5, to prevent the bilging of the latter from the weight of the contents of the barrel, reinforcing rings 7, are carried within the outwardly extending rims 6, said reinforcing rings being preferably of half-oval shape and abutting against the heads 5, of the barrel. The outer edges of the head rims 6, are preferably provided with inwardly extending flanged or hooked portions $6^a$, adapted to take over the outer edges of the half-oval reinforcing rings and presenting an advantageous welding edge or surface for the welding 8, as illustrated most clearly in Figs. 1, and 5, of the drawings.

The reinforcing heads 5, are preferably initially held or secured within the chime welding rims 4, by bending the welding edges 4ᵇ, inwardly to form retaining crimps "a" to engage the flanged portion 6ᵃ, as shown most clearly in Fig. 2, of the drawings. The heads 5, being thus securely held in position the welding can be carefully and properly carried out, the welding flame being adapted to melt down the added welding material together with the projecting welding edges 4ᵇ, of the chime welding rims and carry over and distribute the same in a strong homogeneous mass as indicated most clearly in Fig. 5, of the drawings.

The arrangement and disposition of the edges of the rims 4, and 6, together with the subjacent acutely tapered outer edge of the half-oval reinforcing ring provides an exceedingly economical and convenient welding point for welding as in "autogenous" welding, or other modern welding processes.

From the foregoing description, taken in connection with the accompanying drawings, the operation and advantages of my invention will be readily understood.

Having thus described some of the embodiments of my invention, what I claim and desire to secure by Letters Patent is,—

1. A barrel, comprising a body, heads provided with outwardly extending rims mounted within and terminating in welding proximity to the ends of said body, half-oval rings abutting against said heads and having their flat portions abutting against and seated within said rims, and a welding uniting the edges of said body to said rims and the outer edges of said rings.

2. A barrel, comprising a cylindrical body provided with head-supporting chime-welding rims, heads provided with flanged rims seated and terminating within said chime-welding rims, reinforcing rings carried within said flanged rims and presenting relatively thin acutely tapered welding edges in close proximity to the edges of the latter, and a welding uniting said chime-welding rims to said flanged rims and tapered welding edges.

3. A barrel, comprising a body provided with chime rims provided with head supporting shoulders and chime-rim welding edges, rimmed heads resting on said shoulders and within said chime-rims, reinforcing rings carried within said rimmed heads and presenting relatively thin acutely tapered welding edges in welding proximity to said first named welding edges, and an autogenous welding extending about and uniting the outer edges of said chime and head rims to said welding edges of said reinforcing rings.

4. In a metallic receptacle, a body provided with a shouldered chime-welding rim, a head resting on said shouldered portion and provided with a rim terminating in a hooked flange, the base of the latter being slightly inset but in welding proximity to said chime-welding rims, a half-oval reinforcing ring having its flat side abutting against said head and head rim and presenting a relatively thin welding edge engaged by said hooked flange, and an acutely tapered welding agent uniting the exposed edges of said rim and hooked flange to said tapered welding edge of siad reinforcing ring.

5. A barrel, comprising a body provided with chime rims having head supporting shoulders and chime rim welding edges, rimmed heads resting on said shoulders and provided with inwardly extending short hooked portions inset from but in close proximity to said chime rim welding edges, half-oval reinforcing rings carried and exposed within said rimmed heads and having their outer edges acutely tapered and engaged by said short hooked portions, and a welding agent extending about and uniting the outer edges of said chime rim and the terminating portions of said hooked portions of said head rims.

6. In a metallic receptacle, a cylindrical shaped main body portion, a head having an outwardly extending rim seated within the end of said main body portion, a half-oval ring having one edge resting against said head and having its flat portion seated within said rim, said rim having a short hooked portion extending over the outer or opposite edge of said ring and slightly inset from the end of said main body portion, and a uniting agent uniting the end of said main body portion to the short hooked portion of said rim.

7. A barrel, comprising a cylindrical body provided with off-set chime welding rims, rimmed heads seated within the latter and terminating in inwardly extending acute angled hooked flanges having their bent over base portions slightly inset and in close proximity to the edges of said chime welding rims, a relatively thin acutely tapered half-oval ring carried by each of said rimmed heads, one edge resting against said heads and the opposite edge engaged by said hooked flanges, and a metallic uniting agent uniting said hooked flanges and said chime welding rims.

In testimony whereof I have affixed my signature in presence of two witnesses.

AUGUST M. KRUSE.

Witnesses:
GEO. J. SCHLOSSER,
CURTIS M. WILLOCK.